(12) United States Patent
Kim et al.

(10) Patent No.: US 6,323,950 B1
(45) Date of Patent: Nov. 27, 2001

(54) CHROMATIC DISPERSION MEASUREMENT FOR OPTICAL COMPONENTS

(75) Inventors: Kwang S. Kim, Red Bank; Liyan Zhang, Middletown, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/406,723

(22) Filed: Sep. 28, 1999

(51) Int. Cl.[7] ........................................ G01B 9/02
(52) U.S. Cl. ................................. 356/477; 356/73.1
(58) Field of Search ..................... 356/73.1, 451, 356/453, 477; 250/227.14, 227.19, 227.27; 385/12, 14

(56) References Cited

U.S. PATENT DOCUMENTS

| | | | |
|---|---|---|---|
| 4,523,847 | * 6/1985 | Bjorklund et al. | 356/453 |
| 4,556,314 | * 12/1985 | Stone | 356/73.1 |
| 4,710,022 | * 12/1987 | Soeda et al. | 356/73.1 |
| 5,956,131 | * 9/1999 | Mamyshev et al. | 356/73.1 |

* cited by examiner

Primary Examiner—Samuel A. Turner

(57) ABSTRACT

A chromatic dispersion measurement technique for optical components using baseband amplitude response of RF modulated optical signals and a dispersion reference in providing a measurement both of the magnitude of the dispersion and whether the dispersion is positive or negative.

21 Claims, 1 Drawing Sheet

CHROMATIC DISPERSION MEASUREMENT FOR OPTICAL COMPONENTS

BACKGROUND OF THE INVENTION

1. Field of the Invention

This invention relates to the measurement of chromatic dispersion of optical components and, more particularly, to the measurement of chromatic dispersion of narrow band optical components having a large dispersion variation in a narrow transmission band.

2. Description of the Related Art

As is known and understood, chromatic dispersion is an important optical parameter which affects optical transmission system performance. For such reason, those high data rate systems which have been deployed and which are presently being developed require a detailed dispersion characterization of the various optical components in the transmission path. Because some of the components (such as narrow band filters) have considerably high chromatic dispersion to the optical signal wavelengths, a dispersion characterization of such components becomes an important consideration of the design engineer. Although component dispersion measuring electronic instruments have been described (see, for example, U.S. Pat. No. 5,033,846 —Hernday et als), those commercial dispersion test sets are especially intended for determining chromatic dispersion in single mode optical fibers. Attempts to utilize such electronic instruments for measuring chromatic dispersion in optical components, however, have generally not provided accurate measurement, especially where the components have a large dispersion variation in a narrow transmission band. Illustrative of these components are narrow band optical filters as employed in higher channel count DWDM (Dense Wavelength Division Multiplex) systems.

Currently, two available commercial test sets to measure chromatic dispersion of optical components are based on a group delay measurement technique—with the dispersion being calculated from the group delay data. The first, more popular, reliable and accurate technique employs delay curve fitting and requires group delay data as a function of wavelength in determining an analytic function that is fitted to the data; dispersion values are then obtained by taking a derivative of the function with respect to the wavelength. (However, because this technique requires the obtaining of group delay data over a wide wavelength range to obtain reasonable accuracy, the technique has been determined somewhat less than ideal for narrow band optical component measurements.) The second, less popular technique calculates dispersion from group delays at two adjacent wavelengths—without having to measure the group delay data at many wavelengths as with the curve fitting approach. (But, with this technique, a difficulty resides in trying to obtain accurate dispersion values when the wavelength and the group delay differences are either very small or very large.)

Other chromatic dispersion measurement techniques are also available—such as an Interferometric Method, in which a relative phase of signals from two optical paths is used, one from the device under test (DUT) and one from a reference; and a Time Domain Measurement Method, in which actual pulse width changes are measured in the time domain due to transmission through the test sample for known spectral widths. In an alternative Swept Frequency Technique, on the other hand, dispersion is calculated from the interference pattern of two different wavelengths; in one manner employing several lasers to generate amplitude variation due to a phase difference between each of the test signals and a reference signal, with the group delay data for dispersion calculation being obtained from the amplitude variation due to the interference—while in a second manner, a tunable laser is employed to generate two modulation side bands by modulating a light source at various wavelengths, with the dispersion being directly calculated from the interference pattern.

While these chromatic dispersion measurement techniques have proved useful for dispersion measurements of optical fibers in which the dispersion does not vary rapidly over a wide wavelength range, they have been found to be less than desirable for optical component measurements where there exist a very high dispersion variation within narrow transmission bands—and because the group delay data for dispersion calculation are difficult to obtain when the phase change is very large for a small optical wavelength change. In those instances, significant measurement errors arise.

SUMMARY OF THE INVENTION

As will become clear from the following description, a measurement technique embodying to the invention measures chromatic dispersion of optical components by obtaining the dispersion directly from the baseband amplitude response of RF modulated optical signals, without having to measure group delay of the component under test. By setting up the baseband amplitude response measurement using a dispersion reference, the technique of the invention allows a reliable and accurate measurement of even a small dispersion, and additionally provides an accurate measurement of its sign being positive or negative.

As will be seen, a tunable optical source output is modulated, according to the invention, using a swept RF source and a modulator—which, along with a signal analyzer, is commercially available. Utilizing a wavelength meter provides monitoring of the wavelength of the optical source in a highly accurate manner, and using a 2×2 optical switch, the modulated signal (after passing through a reference fiber), is either inputted to the signal analyzer through the DUT device under test or directly inputted to the analyzer, bypassing the DUT, depending on the measurement stage. As will also be described, the detected optical signal amplitude is recorded as a function of the modulation frequency—and the amplitude trace obtained shows sharp minimums at certain modulation frequencies, depending on the dispersion of the DUT device (due to destructive interference of the two side modes, i.e., the sum and difference of the optical and modulation frequencies). The dispersion of the device under test is then calculated from the frequencies of the minimum amplitudes.

As will be appreciated by those skilled in the art, the technique of the invention allows for accurate measurement of chromatic dispersion of these narrow band optical filters and of other similar narrow band optical components. As will also be appreciated, the technique allows for accurate measurement dispersion of these components—especially when large dispersion variations are present within the transmission band—which is not generally possible using the type of currently available commercial dispersion test sets that are available for fiber measurement.

BRIEF DESCRIPTION OF THE DRAWING

These and other features of the invention will be more clearly understood from a consideration of the sole FIGURE of the Drawing which illustrates a chromatic dispersion measurement apparatus setup according to the invention.

DETAILED DESCRIPTION OF THE INVENTION

Figure 1:
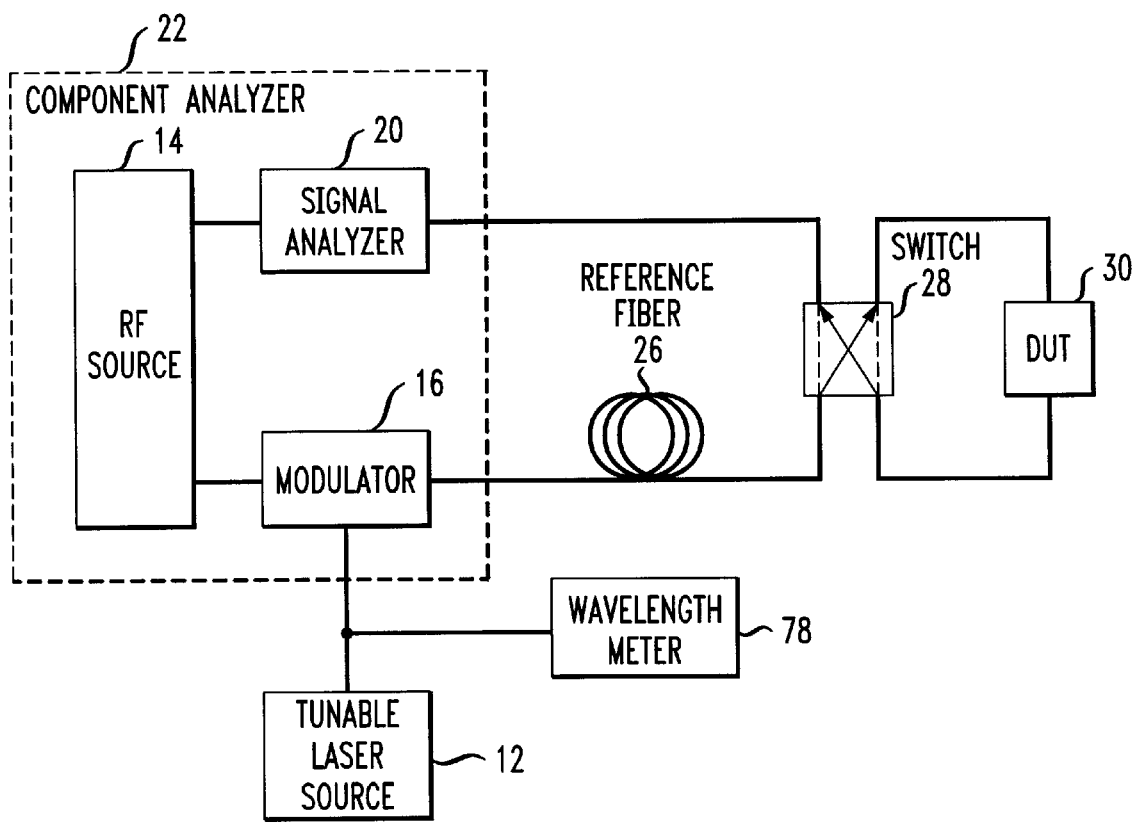

An understanding of the chromatic dispersion measurement apparatus and technique more easily follows from an understanding of the theory behind chromatic dispersion measurement. Thus, if an optical signal were modulated with an RF frequency, two modulation side bands are generated $\omega_o+\omega_m$ and $\omega_o-\omega_m$, where $\omega_o$ and $\omega_m$ are the optical and RF modulation frequencies, respectively. Because the upper and lower side band components have different group velocities, the detected signal amplitude, after passing through a DUT device under test, depends upon the relative phase difference of the two components. Since the relative phase depends upon the modulation frequency, $\omega_m$, the amplitude as a function of modulation frequency will exhibit well-defined minima when the components are out of phase by $\pi$. Dispersion of the DUT can then be calculated from the minimum amplitude frequencies. As the time varying optical signal amplitude is represented as $$E(t, z) = E_0 \left[ \cos(\omega_0 t - \beta_0 z) + \frac{m}{2} [\cos((\omega_0 + \omega_m)t - \beta_+ z) + \cos((\omega_0 - \omega_m)t - \beta_+ z)] \right] I, \quad (1)$$

where z, $E_o$ and $m$ are distances along the fiber, amplitude and modulation index, respectively, and where $\beta_o$ and $\beta_\pm$ are the propagation constants for the frequency components $\omega_o$ and $\omega_\pm$, respectively; and as the propagation constant $\beta_\pm$ can be expressed by the Taylor expansion $$\beta_\pm(\omega_\pm) = \beta_0 + \beta_1(\omega_\pm - \omega_0) + \frac{1}{2}\beta_2(\omega_\pm - \omega_0)^2 +, \quad (2)$$

where $\beta_1$ and $\beta_2$ are the first and the second derivatives of the propagation constant with respect to frequency, respectively, then by substituting Eq.(2) into Eq.(1) it can be shown that the detector output, I, after low pass filtering can be expressed as:

$$I = \frac{1}{4}\cos^2\left(\frac{1}{2}\beta_2\omega_m^2 z\right) \quad (3)$$

Eq.(3) illustrates that the amplitude becomes zero whenever the argument equals $\pi/2$ times odd numbers. Since the dispersion, D, is related to $\beta_2$ by $$D = -2\pi C \beta_2/\lambda^2 \quad (4)$$

it can be shown that the total dispersion $D_z$ in ps/nm is related to the zero amplitude frequencies by the equation $$D \cdot z = \frac{(2n+1)c}{2\lambda^2 f_n^2}, \quad n = 0, 1, 2, 3 \ldots \quad (5)$$

where c is the velocity of light and $f_n$ is the nth zero amplitude modulation frequency.

For measurements of samples with dispersion less than 160 ps/nm, the sample is connected in series with a reference optical fiber with known dispersion properties. The first zero amplitude frequency of the reference fiber will then be shifted due to the device under test by $$\delta(D \cdot z) = -\frac{c\delta f_0}{\lambda^2 f_0^3} \text{ for } n = 0 \quad (6)$$

with the lowest measurable dispersion in actual measurement being limited by the modulation frequency range. From the amount of frequency shift and its direction, the dispersion of the DUT device can be calculated then, using Eq.(6).

For the measurement setup of FIG. 1, a tunable optical source 12 (e.g. a single-mode tunable laser) is modulated using a swept RF source 14 and a modulator 16. The wavelength of the laser source is monitored using a wavelength meter 18, and a signal analyzer 20 is coupled with the RF source 14. An optical component analyzer 22 including the swept RF source 14, the modulator 16, and the signal analyzer 20 is commercially available as a Hewlitt Packard HP8703A lightwave component analyzer.

The reference fiber is shown at 26 and a 2×2 optical switch 28 is employed, such that the modulated signal from the laser source 12, after passing through the reference fiber 26, is either inputted to the signal analyzer 20 through the DUT device 30 or directly inputted to the signal analyzer 20 bypassing the device 30, depending on the measurement stage. The detected output signal amplitude is recorded as a function of modulation frequency—with the chromatic dispersion of the DUT device 30 being calculated from the frequencies of the minimum amplitudes.

In operation, for the measurement of a large dispersion with a minimum amplitude frequency less than 20GHz, the dispersion can be calculated directly from Eq. (4). When the dispersion is small with the frequency greater than 20GHz, the minimum amplitude frequency of the reference fiber 26 is measured. Then, the DUT device 30 is connected in series with the reference fiber 26, and the minimum amplitude frequency measured again. From the frequency change due to the DUT device under test (as in Eq.(6)), the dispersion of the DUT device 30 is calculated. The sign of the dispersion (positive or negative) is determinable from the direction of the frequency shift. As will be appreciated, the frequency increases if the dispersions of the reference fiber and the DUT device have different signs; on the other hand, the frequency decreases if the dispersion of the reference fiber and the DUT device have the same sign. In this respect, the reference fiber 26 will be understood to be a reference device whose chromatic dispersion properties are known.

The chromatic dispersion measurement technique of the invention for narrow band optical filters, as an example, proved more accurate than with commercial test sets of the type used for measuring dispersion of optical fibers. Employing the group delay method of measurement for these commercially available equipments was found exceedingly difficult to be accurately measured for devices with very large or small group delay variations within the narrow band. In particular, such delay and wavelength measurement errors utilizing these prior arrangements were amplified in the dispersion calculations, frequently causing errors of more than an order of magnitude. Although the trend of moving window average appeared to follow qualitatively the actual data trend, it was determined not to be reliable because the trend oftentimes was significantly affected by the measurement errors. Basing the direct measurement method of the invention on baseband amplitude response to the swept modulation frequency was determined to be intrinsically more accurate because it did not require the group delay measurement and numerical differentiation of the group delay data. At the same time, the resultant positive or negative dispersion sign determination resulting with the invention allows for the correct compensation of such dispersion in designing the overall optical communications system. According to the invention, both the magnitude of the chromatic dispersion and its sign can thus be measured and analyzed.

While there has been described what is considered to be a preferred embodiment of the invention, and the method of its use, it will be readily appreciated by those skilled in the art that modifications can be made without departing from the scope of the teachings herein. For at least such reason, therefore, resort should be had to the claims appended hereto for a true understanding of the invention.

We claim:

1. Apparatus for use in measuring the chromatic dispersion of an optical component under test comprising:
   a tunable optical source;
   a modulator having a first input coupled to an output of said source;
   a source of swept RF signals coupled to a second input of said modulator;
   an optical switch having input and output terminals;
   a dispersion reference coupled between said input terminal of said switch and an output of said modulator; and
   a signal analyzer having a pair of input terminals respectively coupled to said swept RF signal source and to said output terminal of said optical switch;
   with said optical switch being controllable to couple a modulated signal from said modulator through said dispersion reference directly to said signal analyzer or by way of said optical component under test.

2. The apparatus of claim 1 wherein said switch is a 2×2 optical switch having a pair of inputs and a pair of outputs.

3. The apparatus of claim 1 wherein said dispersion reference comprises an optical fiber of known chromatic dispersion.

4. The apparatus of claim 1 also including a wavelength meter for monitoring the wavelength of said tunable optical source.

5. The apparatus of claim 1 wherein said signal analyzer provides a plot of detected signal amplitude as a function of the modulation frequency of said swept RF source.

6. The apparatus of claim 5 wherein said signal analyzer provides an amplitude trace depicting sharp minimums of varying frequencies in accordance with the dispersion characteristics of the optical component under test.

7. The apparatus of claim 6 including means for recording the frequencies of minimum amplitude for calculating the dispersion of said optical component.

8. The apparatus of claim 7 including means for calculating the magnitude of the dispersion from the frequencies of minimum amplitude recorded.

9. The apparatus of claim 7 including means for calculating the sign of the dispersion as positive or negative from the frequencies of minimum amplitude recorded.

10. The apparatus of claim 1 wherein said optical source comprises a single-mode laser.

11. Apparatus for use in measuring the chromatic dispersion of an optical component under test comprising:
    an optical fiber of known chromatic dispersion;
    a signal analyzer; and
    an optical switch coupling an amplitude modulated RF signal through said fiber directly to said analyzer or by way of said optical component under test.

12. The apparatus of claim 11 wherein said signal analyzer provides an amplitude trace for measuring the magnitude of the dispersion characteristic of the optical component under test.

13. The apparatus of claim 11 wherein said signal analyzer provides an amplitude trace for determining the sign of the chromatic dispersion of the optical component under test as positive or negative.

14. The apparatus of claim 11 wherein said signal analyzer provides an amplitude trace depicting sharp minimums of varying frequencies for measuring the magnitude of chromatic dispersion of the optical component under test and for determining the sign of the dispersion as being positive or negative.

15. The apparatus of claim 11 wherein the optical component under test comprises a narrow band optical component.

16. The apparatus of claim 15 wherein said optical component under test is an optical filter of narrow passband.

17. A method of measuring chromatic dispersion of optical components in which the dispersion is obtainable directly from the baseband amplitude response of RF modulated optical signals coupled to a signal analyzer through a reference fiber of known chromatic dispersion, and through said fiber and an optical component under test, respectively.

18. The method of claim 17 in which the dispersion is calculable from determinations of frequencies at which minimum baseband amplitude responses appear.

19. The method of claim 17 in which the magnitude of the dispersion is calculable from determinations of frequencies at which minimum baseband amplitude responses appear.

20. The method of claim 17 in which the sign of the dispersion as positive or negative is determinable from frequency shift between frequencies of minimum baseband amplitude responses.

21. The method of claim 17 in which the magnitude of the dispersion is calculable from determinations of frequencies at which minimum baseband amplitude responses appear, and in which the sign of the dispersion as positive of negative is determinable from frequency shift between frequencies of minimum baseband amplitude responses.

* * * * *